United States Patent
Li et al.

(10) Patent No.: US 6,738,819 B1
(45) Date of Patent: May 18, 2004

(54) DYNAMIC ADMISSION CONTROL FOR IP NETWORKS

(75) Inventors: Mingxing Li, Kanata (CA); Osama O. Aboul-Magd, Kanata (CA); James Yan, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/472,151

(22) Filed: Dec. 27, 1999

(51) Int. Cl.[7] .......................... G06F 15/16; G06F 11/00
(52) U.S. Cl. ................ 709/229; 709/227; 709/224; 370/235; 370/232; 370/231; 370/230
(58) Field of Search ................ 709/232, 235, 709/223, 224; 370/256, 395.1, 395.21, 395.43, 360

(56) References Cited

U.S. PATENT DOCUMENTS

| | | | | |
|---|---|---|---|---|
| 5,491,801 A | * | 2/1996 | Jain et al. | 709/235 |
| 5,727,002 A | * | 3/1998 | Miller et al. | 709/237 |
| 5,784,358 A | * | 7/1998 | Smith et al. | 370/235 |
| 5,862,126 A | * | 1/1999 | Shah et al. | 370/233 |
| 5,917,804 A | * | 6/1999 | Shah et al. | 219/209 |
| 6,091,724 A | * | 7/2000 | Chandra et al. | 370/256 |
| 6,144,673 A | * | 11/2000 | Korus | 370/397 |
| 6,223,215 B1 | * | 4/2001 | Hunt et al. | 707/501.1 |
| 6,259,699 B1 | * | 7/2001 | Opalka et al. | 370/389 |
| 6,289,388 B1 | * | 9/2001 | Disney et al. | 370/401 |
| 6,295,285 B1 | * | 9/2001 | Whitehead | 370/329 |
| 6,341,309 B1 | * | 1/2002 | Vaid et al. | 709/223 |
| 6,442,138 B1 | * | 8/2002 | Yin et al. | 370/232 |
| 6,442,615 B1 | * | 8/2002 | Nordenstam et al. | 709/241 |
| 6,493,317 B1 | * | 12/2002 | Ma | 370/237 |

FOREIGN PATENT DOCUMENTS

| | | | | |
|---|---|---|---|---|
| CA | 2275407 | 3/1997 | ........... | H04Q/11/04 |
| CA | 2208096 | 6/1997 | ........... | H04L/12/56 |
| CA | 2230633 | 2/1998 | ........... | H04L/12/56 |
| CA | 2242219 | 6/1998 | ........... | H04L/12/56 |

* cited by examiner

Primary Examiner—David Wiley
Assistant Examiner—Joseph E Avellino

(57) ABSTRACT

A dynamic admission control(AC) mechanism for accepting traffic service requests to a carrier IP network based on an iterative measurement method, is disclosed. For each service offered, a network planner assigns a certain amount of resources. A QoS manager keeps track of the amount of unused resources for each particular service. The amount of unused resources are estimated using actual measurements of load levels on various links of the network. Each router monitors the loading level on each of its outgoing interfaces. Those measurements are then transferred to the QoS manager upon request, or periodically at time intervals "T".

25 Claims, 6 Drawing Sheets

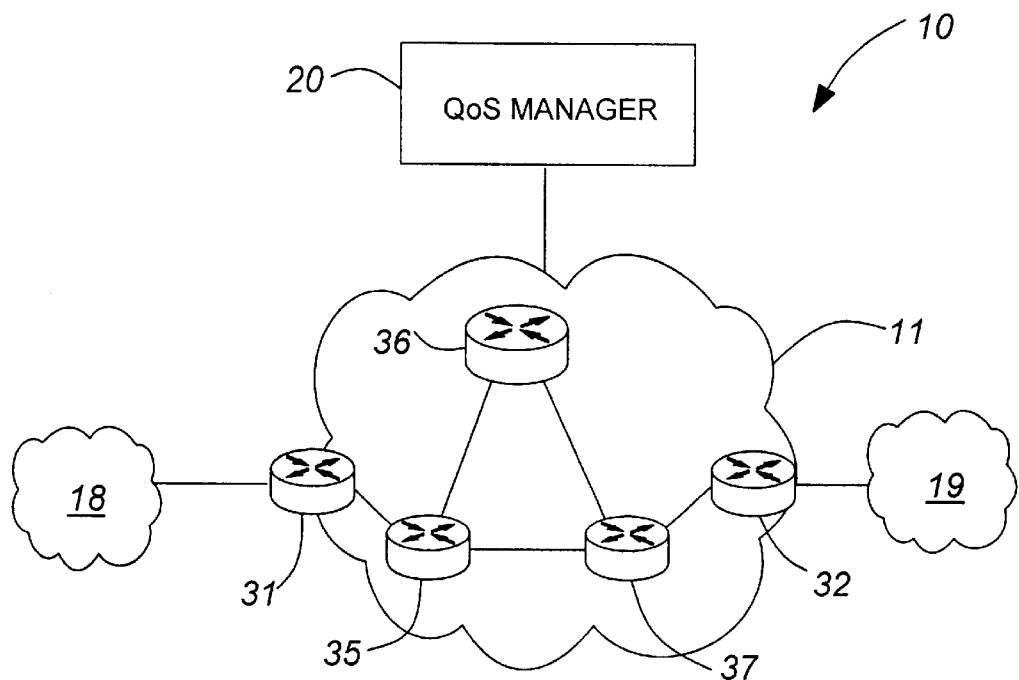
FIG. 1
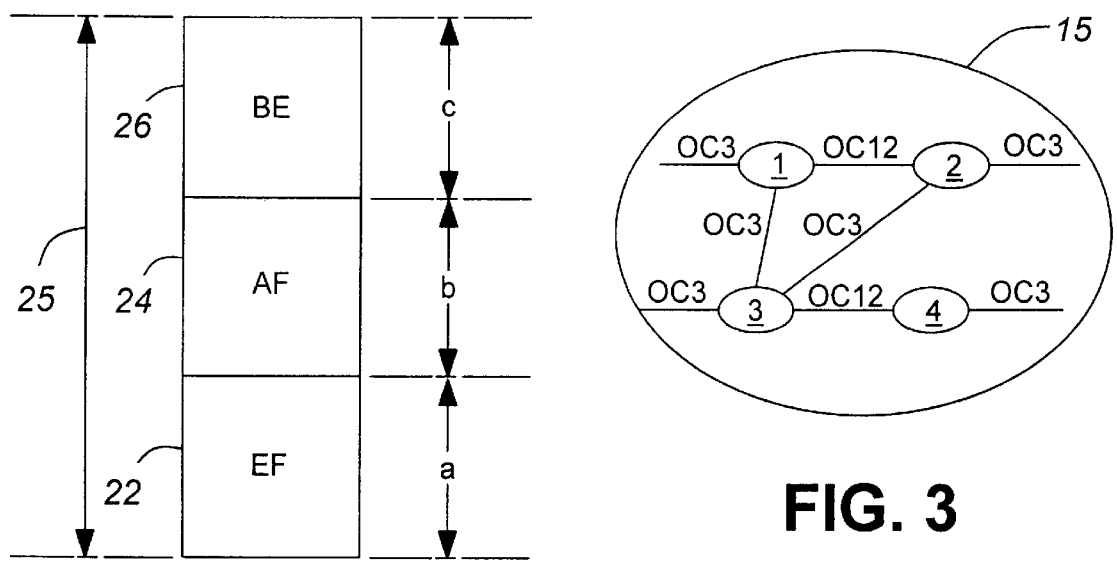
FIG. 2
FIG. 3

DYNAMIC ADMISSION CONTROL FOR IP NETWORKS

BACKGROUND OF THE INVENTION

1. Field of Invention

The present invention relates to IP networks and in particular to a dynamic admission control (AC) function providing assured Quality of Service (QoS) for an IP network with differentiated services (DiffServ) capabilities.

2. Related Art

Present IP carrier networks provide unreliable best-effort service to their users. Regardless of the application type all packets receive the same treatment. With the expansion of the Internet and the availability of high capacity routing and transmission technology, Internet Service Providers (ISPs) are planning networks capable of providing differentiated services to their customers with QoS assurances in addition to the traditional best-effort service.

Two network architectures have been proposed by the Internet Engineering Task Force (IETF) to support the IP QoS requests. The first architecture allows resource reservation per flow. This is called the Integrated Services (IntServ) architecture and uses a reservation setup protocol (RSVP) as the signalling protocol to pass the QoS requests from the end system to each intermediate router along a data path. An admission control (AC) mechanism at each router along the path verifies the resources needed to provide the requested QoS. If the QoS requirements can be met, resources are reserved on an end-to-end basis, and each router is required to maintain a state for each flow traversing the network.

This architecture is suitable for a small network with a small number of flows to be managed, but becomes a problem in a carrier-scale network, where each router needs to keep states for a large number of flows.

In the second architecture, the complexity is moved to the edges of the network, hence keeping the core simple. This architecture is called the Differentiated Services (DiffServ, or DS) and it uses traffic aggregates instead of maintaining a state for each individual flow at each router. Traffic conditioning is done at the edge of the network as part of the end-to-end service. The routers in a DiffServ network implement a set of well-defined packet forwarding treatment called Per-Hop Behavior (PHB). Each PHB is given a unique default DiffServ code-point (DSCP) in the DiffServ field of the packet header, e.g. type of services (ToS, or service type) bytes in IP version 4, or Traffic Class byte in IP version 6. At the DiffServ network boundary, the routers classify the traffic flows and mark the DiffServ field with the appropriate code-point. Intermediate routers along the path provide different forwarding treatment to the packets according to the code-point in each packet. It is expected that edge routers will only maintain a state record for each individual flow and therefore, scalability is no longer an issue. The DiffServ architecture is preferred as it is easy to implement and scales to a large network.

The ability to differentiate between data packets having different QoS requirements is a necessary, but not sufficient condition for offering assured QoS. For satisfying services with QoS parameters attached to them, traffic management mechanisms are required to ensure that sufficient resources exist to meet the service objectives. Prominent among those mechanisms is the AC function which limits the volume of the traffic accepted to the network to allow the various QoS objectives to be satisfied.

A service request may be a single-ended or a double-ended request. Although both types of requests specify the amount of traffic and the services required, a single-ended request specifies only the traffic origination. A double-ended request specifies the traffic origination and the traffic destination. Both single-ended and double-ended requests need to be supported by an efficient admission control method whenever assured performance is required.

The support of assured QoS in a DiffServ network is not an easy task since there is no a priori knowledge of the path to be followed, particularly for single-ended requests which could be directed to any destination. A basic weakest link method has been suggested for controlling the amount of traffic allowed to enter a network. This method is very inefficient in terms of bandwidth utilization.

Accordingly, there is a need to provide a method and a mechanism for dynamically supporting IP QoS in a DiffServ network, to ensure that QoS requirements are met for admitted data packets, while efficiently utilizing the network.

SUMMARY OF THE INVENTION

An object of the invention is to provide admission control mechanisms which alleviate totally or in part the drawbacks of the prior art.

It is another object of the invention to provide a mechanism for a carrier IP network to perform admission control (AC) for service requests with assured QoS. The AC mechanism operates for both single or double ended requests by dynamically deciding whether the request should be accepted or rejected.

Still another object of the present invention is to provide admission control (AC) using an iterative measurement based method for carrier IP networks. A QoS manager keeps track of the resource availability of the network, and accepts a new request only if the requested resource is available. The QoS manager maintains an accurate resource occupancy table using, or supplementing with direct measurements from the network.

According to one aspect of the invention, an iterative weakest link method is provided. The method comprises the steps of initializing a QoS manager at an admit limit (AL) representing a bandwidth utilization capacity allocated to a service offered on the weakest link of the network; receiving a service request including a service type and a required bandwidth; comparing the AL with the required bandwidth and accepting the request whenever the required bandwidth does not exceed the AL, and rejecting the request whenever the required bandwidth exceeds the AL; maintaining the AL if the request is rejected and dynamically adjusting the AL by the amount of required bandwidth after accepting the request, while periodically measuring the traffic load on each link of the network to provide an updated AL for each offered service.

According to another aspect of the invention, a path-based method using the iterative measurement technique with the edge routers supplying the path, is provided. This method comprises the edge routers maintaining a spanning tree, and the QoS manager maintaining the link occupancy table. Edge routers intercept the service request sent by a customer, identify the path the request will use, and forwards the service report together with the assigned path to the QoS manager. The QoS manager accepts or rejects the request based on the service requested, the path required, and the available capacity of the links along the assigned path.

According to still another aspect of the invention, a path-based method using the iterative measurement with the QoS manager maintaining both. the routing table and the link occupancy table, is provided.

The AC process according to the invention advantageously provides support for both single-ended and double-ended service requests, and also provides improved bandwidth utilization.

The invention is not limited to the features disclosed in the "Summary of the Invention" section; it nonetheless may reside in a sub-combination of the disclosed features.

DESCRIPTION OF THE DRAWINGS

The present invention and its advantages will be better understood from the following description of the embodiments of the invention illustrated in the drawings, where:

FIG. 1 illustrates a QoS manager for admission control of requests in a carrier IP network;

FIG. 2 illustrates the bandwidth allocation to different service types;

FIG. 3 is an example of node connections in carrier IP networks;

Figure 4:
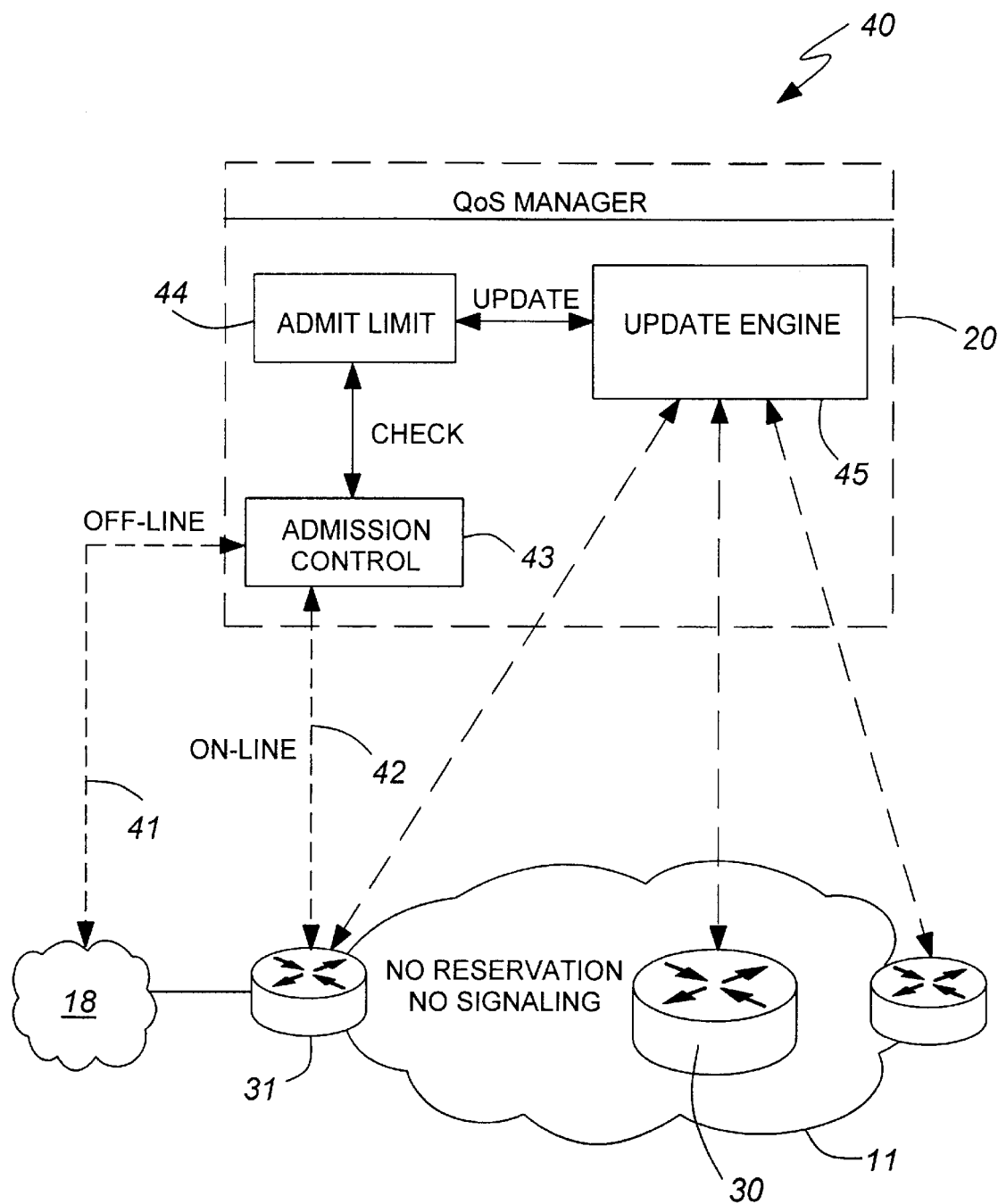
FIG. 4 illustrates the architecture of a DiffServ network using the iterative measurement based method according to the invention.

Similar references are used in different figures to denote similar components.

DETAILED DESCRIPTION OF THE PREFERRED EMBODIMENTS

The following description relates to preferred embodiments of the invention by way of example only and without limitation to the combination of features necessary for carrying the invention into effect.

An IP network with differentiated services capabilities is intended to provide multiple QoS-based services using a small set of per hop behavior mechanisms. The resources in a DiffServ network must be appropriately managed for offering the available services with assured QoS support. There are two models for managing the resources: the distributed approach and the centralized approach. In the distributed approach, each router in the network manages its own resources and makes admission control decisions based on the utilization of its own resources. However, since provision of mechanisms for making resource reservations along a path is too complex, a distributed admission control is not considered herein.

The invention contemplates a centralized resource management model, where the network elements have the ability to report their operational parameters to a central management system. The management system is provided with a QoS manager which is responsible to negotiate Service Level Agreements (SLAs) with its neighboring networks, and to manage the usage of the internal resources of the network under its control. The QoS manager is provided with a mechanism for dynamic admission of service requests. The parameters of a service request which are relevant for dynamic admission control (AC) mechanisms are: the source and the destination, the service type, and the amount of bandwidth required. It is to be noted that a single-ended service request specifies only the traffic origination, which means the packets are forwarded to any destination in the network.

FIG. 1 illustrates at 10 a QoS manager 20, operating in a centralized resource management IP carrier network 11. Network 11 is of the IP DiffServ type comprising edge routers 31, 32 and core routers 35–37. Edge and core routers implement packet forwarding mechanisms such as per hop behaviour (PHB) for providing differentiated services to a traversing traffic. The QoS manager 20 is used to manage the resources of the network 11 and to perform the admission control (AC) function. The service requests are sent by customer 18, 19 to the edge router 31, 32, or to the QoS manager 20 directly.

FIG. 1 shows five routers, but it is to be understood that the number of routers can be higher. Also, in the following drawings the core of the network 11 e.g. routers 35–37 as well as any other non-edge routers are globally denoted with 30. The number of links for a particular offered service is denoted with "n".

FIG. 2 illustrates the bandwidth allocated to various service types. In general, the services can be offered based on "best effort" (BE) shown at 26, "expedited forwarding" (EF) shown at 22, or "assured forwarding" (AF) shown at 24. A link bandwidth is allocated to each service type, based on a specified policy. In the example of FIG. 2, EF service 22 is given a of the total link bandwidth 25, AF service 24 is given b of the total link bandwidth 25, and BE service 26 is assigned c of the total link bandwidth 25.

As explained above, the total bandwidth capacity of each link is distributed 22, 24, 26 to serve various service types offered by the IP network. To meet delay or loss of data packets objectives, the capacity allocated for a service is utilized up to a predetermined maximum allowable capacity, or bandwidth utilization capacity. For services with tight requirement on data packet delay and loss such as 22, the maximum allowable capacity ($R_{max}$) will be lower than the allocated bandwidth a for this service ($R_{max}$<a) in order to meet the stringent delay and loss requirements. For services with loose or no requirements on delay and loss 24, the maximum allowable capacity will be close to the actual allocated bandwidth b to this service ($R_{max} \approx b$).

It is known that a basic weakest link method can be used for deciding whether to allow more traffic to enter a network when receiving a new request. This method takes into account the possibility that the traffic admitted into the network may take any path. The worst assumption is that all the admitted traffic will converge onto the weakest link of the network. To ensure that the QoS requirements are met even for the worst case scenario, the basic weakest link approach ensures that the total traffic volume admitted into a DiffServ network will not exceed the capacity of the weakest link ($R_w$) in the network. In this case, "$R_w$" represents a predetermined and fixed amount of bandwidth for a given service type offered by the network.

FIG. 3 illustrates node connections in a carrier IP network 15, used to exemplify the basic weakest link method. In the example of FIG. 3, all the routers 1, 2, 3, and 4 are inter-connected by optical carrier OC12 or OC3 links. Assuming that 50% of the link capacity is allocated to assured forwarding services (AF) 24, the $R_w$ for this example is the rate of the weakest OC3 link (155 Mbps)

divided by two, i.e. 78 Mbps. As such, the maximum AF request ($R_q$) for all customers should not exceed ($R_w$=78 Mbps).

The above described basic weakest link method provides reliable service level of guarantees. One variable has to be maintained and one comparison has to be performed for taking admission decisions. As mentioned before, the amount of traffic allowed to enter the network ($R_q$) will never exceed the capacity of the weakest link in the network ($R_w$). In this way, even if all the traffic of a service type happens to use the weakest link, the QoS requirements of the admitted traffic are still maintained.

The shortcoming of the basic weakest link method is related to network occupancy which is low since the amount of traffic admitted into the network is limited to an amount corresponding to the weakest link capacity. While this may be acceptable for small networks, for a network with 100 identical links the average occupancy will be 1% of the weakest link capacity, which is generally not acceptable.

The purpose of the present invention is to provide a dynamic admission control (AC) which addresses the network occupancy shortcomings of the basic weakest link method. Accordingly, for each service offered, a network planner initially assigns certain amount of resources. The network itself keeps track of the amount of unused resources for each particular service. This information is kept in the QoS manager 20. The amount of unused resources are estimated using actual measurements of load levels on all links of the network. Each router monitors the loading level on each of its outgoing interfaces. Those measurements are then transferred to the QoS manager 20 upon request, or periodically every time interval (N×T), where "N" is an integer.

FIG. 4 illustrates the architecture and operation of QoS manager 20 according to one embodiment of the invention. Network 11 does not require signaling nor reservation setup. The bandwidth allocation is based on the assumption that it is unlikely for all admitted traffic to use the weakest link at the same time. In reality, the traffic is dispersed over all links.

As shown in FIG. 4, the QoS manager 20 maintains a single variable called the admit limit (AL) for each offered service, except for the best-effort (BE) class 26. An update engine block 45 administers the AL based on measurements polled from all routers 30–32. An AL block 44 records the smallest remaining capacity (min.$R_{rem}$) among all links (1 . . . n) for a particular service.

$$AL = \min.R_{rem}(1 \ldots n) \quad (EQ1)$$

Block 45 updates the AL block 44 with freshly measured smallest remaining capacity (min.$R_{rem}$) for the entire network. This may be done either periodically as it will be later explained in connection with FIG. 5b, or when the AL becomes lower than a preset value. The measurement process can be performed manually, or automatically by block 45.

The process of admitting traffic to network 11 starts by initializing the QoS manager 20 to admit requests up to the weakest link capacity (AL=$R_w$). A service request (Rq) may be sent by customer 18 on-line 42, or off-line 41. An admission control block 43 performs the admission function by comparing the request for traffic with the admit limit (AL) and decides whether to accept or to reject the request.

A service request is accepted if the required bandwidth does not exceed the admit limit (AL). If accepted, reservation for the new request is made and the admit limit (AL) is decreased by the amount of the newly admitted traffic.

Figure 5B:
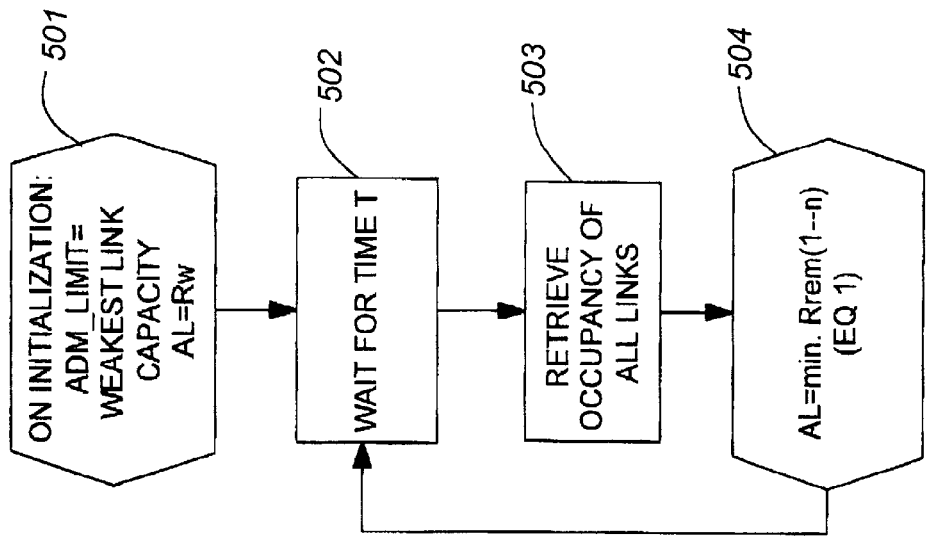
FIG. 5b is a flow chart illustrating the AL management process.
Figure 5A:
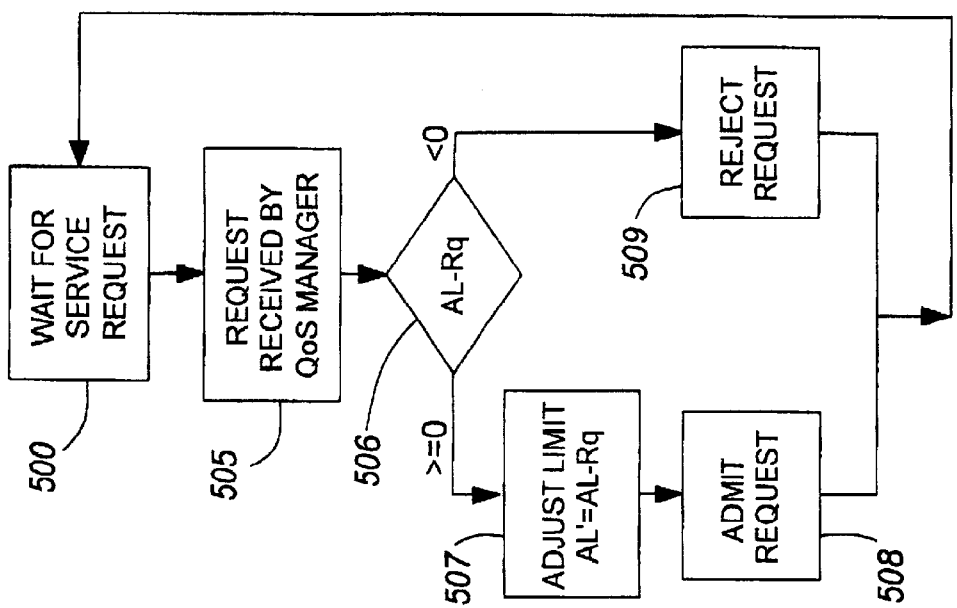
FIG. 5a is a flow chart illustrating the iterative measurement based method for single-ended requests.

FIG. 5a illustrates the iterative measurement method for a single-ended request for one service type. The admission process starts at step 500 where the QoS manager 20 initializes at AL to be $R_w$. When a request $R_q$ is received at step 505, the QoS manager 20 compares $R_q$ with AL, step 506, and accepts the request, step 507, if the admit limit (AL) is higher than the request ($R_q$) or rejects the request, step 509, if the admit limit (AL) is smaller than the request ($R_q$).

$AL > R_q$ request accepted $AL < R_q$ request rejected \quad (EQ2)

When a request is rejected, the value of the admit limit (AL) is maintained unchanged, a request or alarm to add capacity may be generated, and the AC process returns to step 500.

When a request is accepted, the QoS manager 20 automatically computes, step 507, the new admit limit at AL'= AL−$R_q$, and re-initializes AL to AL'.

$$AL' = AL - R_q \quad (EQ3)$$

FIG. 5b is a flow chart illustrating the admit limit (AL) management process. For clarity of exposition, this example assumes that a single-ended request ($R_q$) is received for a particular offered service.

Initially, the admit limit (AL) is set at the weakest link capacity ($R_w$), step 501. Then, a measurement is performed every time interval "T" to find the current utilization of all the links (1 . . . n), step 502. "T" can be set based on the request frequency, the service duration, and may be refined based on experience. When time "T" expires, QoS manager 20 polls for the remaining capacity ($R_{rem}$) on all links (1 . . . n), either from a network management database (not shown), or from routers 30–32 directly, at step 503. At the end of the interval "T", the QoS manager 20 sets the new admit limit AL' to the minimum remaining capacity among all "n" links for the offered service (EQ1), step 504.

Returning now to FIG. 3, AL is initialized to the OC3 service bandwidth utilization capacity, i.e. AL=155 Mbps. When an assured forwarding (AF) service type request with 100 Mbps throughput is received, because AL>100 Mbps, the request is accepted and AL is reduced to 55 Mbps. If a second request is received requiring 10 Mbps, because AL>10 Mbps this request is also accepted and AL is reduced to AL'=45 Mbps.

After an interval "T", a new measurement is performed indicating that all the admitted traffic uses only the OC12 links and not the OC3 link; therefore, the minimum remaining bandwidth (min.$R_{rem}$) is higher than AL'=45 Mbps. Consequently, the QoS manager 20 is reset to the weakest value in the network, i.e. AL=155 Mbps representing the entire OC3 service capacity.

As discussed before, by dynamically and periodically resetting the AL based on iterative measurements performed on all links of the network, more traffic may be admitted into the network 11 of FIG. 4, leading to higher occupancy.

Figure 6:
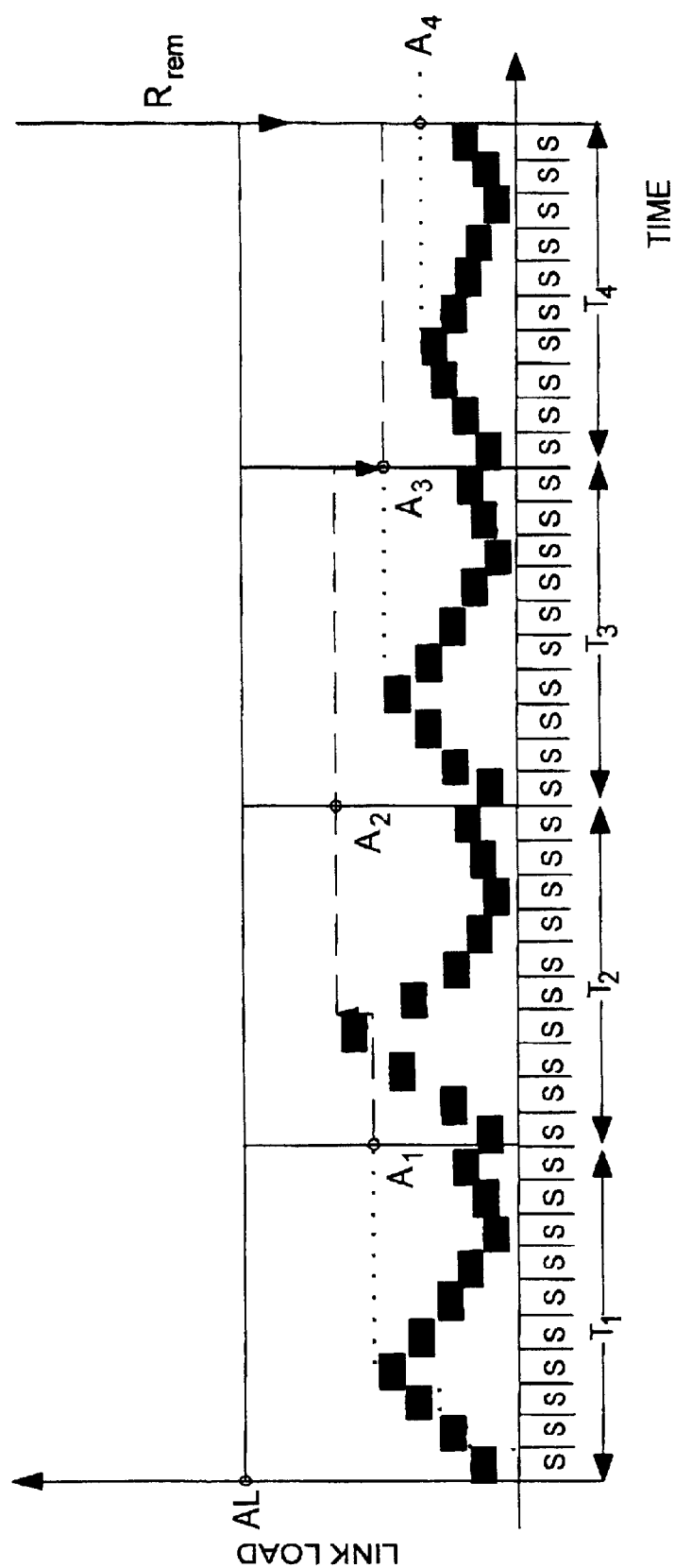
FIG. 6 is a chart illustrating a window based measurement method.

As shown in FIG. 6, the measurements on individual links may be collected using a moving window algorithm of a fixed sampling time "s", where s<T. According to this algorithm, the average load on each link is computed every sampling period "s". At the end of the interval, or measurement window "T", the highest measured value, or peak load (Ai) for the respective window Ti is used as the estimated load for the next window. If for example, the measurement A2 in window T2 is higher than the highest measurement A1 in the previous window T1, the estimated load is immediately raised to A2. If the following measurement reveals A3<A2, then A2 is maintained as the load estimate for window T3. Similarly, A3 will be maintained as the load estimate for window T4 because A4<A3.

The purpose of this estimates is to identify the current peak load as an estimated link load in order to avoid underestimating the existing link load. A smaller "s" gives a higher peak load and consequently, a more conservative load estimate ($R_{rem}$=AL–Ai). It is not necessary for the QoS manager 20 to retrieve measurements every sampling period "s". Instead, the QoS manager 20 may retrieve measurements every "N" sampling periods.

It should be noted that there is always a possibility to underestimate the load level which would result in undesired over admission. Accordingly, it is necessary to leave a backup bandwidth when setting the maximum bandwidth utilization capacity ($R_{max}$) in order to allow for measurement errors, as discussed in connection with FIG. 2. The backup bandwidth may also be allocated to the best effort (BE) traffic when not used.

Figure 7:
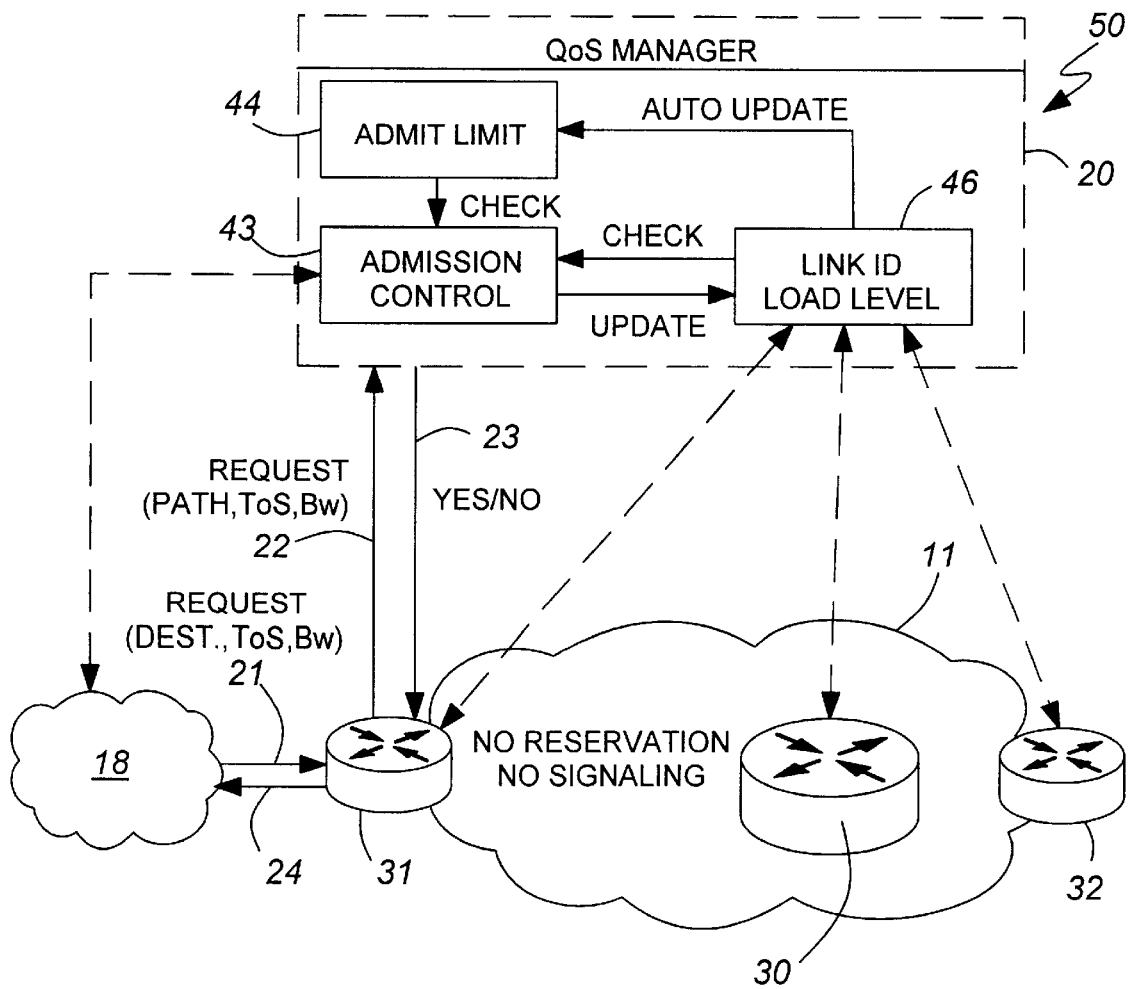
FIG. 7 illustrates the architecture of a carrier IP network using a path based admission control (AC) method.

FIG. 7 illustrates at 50 the architecture of a second embodiment of the invention for a path-based method. This implementation is suitable for servicing more frequent request arrivals and departures with short holding times. In this case, the QoS manager 20 maintains a resource table listing link IDs and the associated link remaining capacity, block 46, for updating the admission control block 43, while each edge router 31, 32, maintains its spanning tree for creating its own routing table.

As shown in FIG. 7, customer 18 sends a double-ended request specifying the traffic destination, desired service, and traffic volume. The request may be sent on line 21, or 41. In any event, the request is intercepted by the edge router 31. Edge router 31 analyses the request and if the request is double-ended, edge router 31 checks its spanning tree and translates the destination address into a unique route representing the shortest path for the traffic to the destination end. Edge router 31 then forwards the request, containing an assigned path and the QoS requirements, i.e. the traffic volume (bandwidth) and the service type requested, to the QoS manager 20 on line 22.

AC block 43 compares the requested bandwidth ($R_q$) against the admit limit (AL) on each link along the assigned path. If resources exist (EQ2), the request is accepted. Once accepted by admission block 43, the QoS manager 20 updates the link load table in block 46 by adding the amount of bandwidth requested onto the link loading level currently recorded in the table. The change of the link load table automatically produces a new admit limit (AL') to be used for admitting single-ended service requests. Now, the request is admitted.

When accepting a single-ended request, all links of the network will be reduced by the amount of the requested/admitted bandwidth.

Finally, AC block 43 sends an acknowledgment to the edge router 31 on line 23, and a response is then forwarded to customer 18 on line 24.

When a double-ended request terminates, QoS manager 20 updates the link load level for all the links on the assigned path, or relies on measurements to capture the change. However, if the time of a single-ended request terminates, QoS manager 20 may prefer to rely on measurements only to capture the change.

In any event, the QoS manager 20 periodically receives measurements performed on all links and consolidates the two values representing the current link load level recorded in the tables and the newly measured load level as shown below:

$$\text{Estimated load level} = w \times (\text{current level as recorded in tables}) + (1-w) \times (\text{newly measured load level}), \quad (EQ4)$$

where "w" is a weighting factor.

Because the currently recorded link load level tends to over-estimate the load, and the measured load level tends to underestimate the load, the consolidation generates an estimated value closer to the existing link load. level. The weighting factor "w" is selected to provide an estimated load as close as possible to the real link load. For an efficient usage of the network, if the newly measured load level is higher than the currently recorded load level in the tables, the higher value will be considered as the estimated load level.

Figure 8:
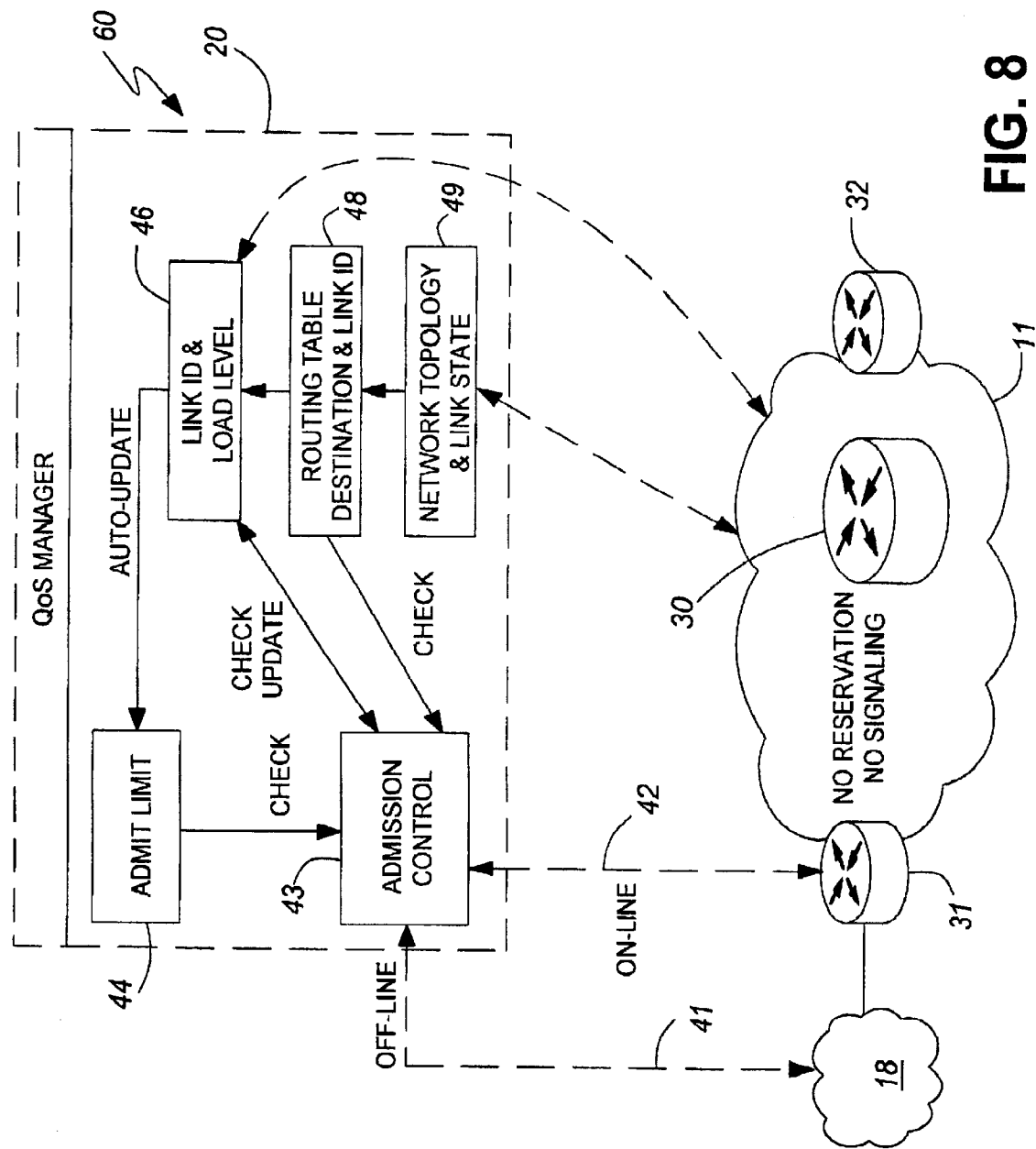
FIG. 8 is an alternative embodiment for the architecture of FIG. 7.

FIG. 8 is another embodiment of the invention in which the routing information is kept in the QoS manager 20. In the alternative architecture of FIG. 8 shown at 60, the QoS manager 20 maintains a routing table with destination and link ID information in block 48 instead of asking edge router 31 to supply the routing information. The QoS manager 20 also runs part of the open short path first (OSPF) protocol to obtain the up-to-date network topology and the link state information, which are recorded in block 49. It then builds and maintains a routing table using the topology information and the link states using some known algorithms, e.g. by running the Dijkstra algorithm with each edge router 31, 32 as the root.

In the embodiment of FIG. 8, the AC block 43 receives a service request on-line 41, or off-line 42. The QoS manager 20 reads the list of links required by the shortest path from the routing table in block 48, checks the remaining capacities on the listed links from the Link Occupancy Table retrieved from block 46, and if the admit limit (AL) on all links involved can satisfy the requirements (EQ2), the request is accepted. If the request is accepted, AC block 43 updates the link ID/loading level 46 which triggers an automatic update of the admit limit (AL) block 44. Now, the request is admitted.

The maintenance of the link occupancy table in block 46 is based on a process which is similar to the process described in connection with FIG. 7. Advantageously, no additional functionality has to be implemented on edge router 31 if a routing table is maintained in block 48.

A dynamic admission control(AC) mechanism for accepting traffic service requests to a carrier IP network based on an iterative measurement method, is disclosed. For each service offered, a network planner assigns a certain amount of resources. A QoS manager keeps track of the amount of unused resources for each particular service. The amount of unused resources are estimated using actual measurements of load levels on various links of the network. Each router monitors the loading level on each of its outgoing interfaces. Those measurements are then transferred to the QoS manager upon request, or periodically at time intervals "T". The AC process according to the invention advantageously provides support for both single-ended and double-ended service requests, and also provides improved bandwidth utilization.

Numerous modifications, variations, and adaptations may be made to the particular embodiments of the invention without departing from the scope of the invention which is defined in the appended claims.

What is claimed is:

1. A method of controlling admission of a service request in an IP network with differentiated services capabilities, said IP network including a plurality of links for communication path: comprising the steps of:

at a network element,
- (a) periodically measuring traffic load on each link in said IP network for each service offered by said network; at a QoS manager,
- (b) administering a single available resource value for each service;
- (c) comparing said available resource value for a service requested with a resource determined by a parameter for said request when receiving said request; and
- (d) determining, in response to the comparison, whether the amount of traffic of said service requested is allowed to enter said network and accepting said requests, said administering step (b) including:
  - periodically determining said available resource value based on the measurement on each link for said service, and
  - dynamically adjusting said available resource value for said service requested based on said parameter to account for the utilization of said IP network by said service.

2. The method of claim 1, wherein said parameter includes a required bandwidth.

3. The method of claim 2, wherein said step of determining said available resource value comprises the step of periodically determining, based on said measurement, a single admit limit (AL) for each service offered by said network, said step of accepting said request comprises the step of accepting said request if said AL for said service requested is not exceeded by the resource, and said step of adjusting said available resource value comprises the step of decreasing said AL for said service requested based on the accepted parameter.

4. The method of claim 3, wherein said step of administering a single available resource value comprises the step of initializing said admit limit (AL) by a predetermined bandwidth utilization capacity allocated to said service offered on the weakest link of said network.

5. The method of claim 4, wherein said step of administering a single available resource value comprises the step of initializing said AL by the smallest remaining capacity on all links for said offered service.

6. The method of claim 4, further comprising accepting said request whenever said required bandwidth does not exceed said AL for said service requested, and rejecting said request whenever said required bandwidth exceeds said AL for said service requested.

7. The method of claim 6, wherein said step of adjusting said available resource value comprising maintaining said AL If said request is rejected, and dynamically adjusting said AL by the amount of said required bandwidth after accepting said request.

8. The method of claim 6, wherein said step of adjusting said available resource value comprises the step of resetting, based on said measurement, said AL to the remaining capacity of the new weakest link of said network.

9. The method of claim 3, wherein said step of periodically measuring is performed off line.

10. The method of claim 3, wherein said step of periodically measuring is performed by each router.

11. The method of claim 3, wherein said step of periodically measuring is performed after a preset time interval.

12. The method of claim 3, wherein said step of periodically measuring is performed each time said admit limit becomes smaller than a preset value.

13. The method of claim 1, wherein said parameter includes a type of the service.

14. The method of claim 1, wherein said parameter includes a destination.

15. The method of claim 1, comprising the following steps performed by an edge router:
- intercepting said request by said edge router;
- determining if said request is single-ended or double-ended;
- identifying an assigned path if said request is double-ended; and
- forwarding the parameter including said assigned path to a QoS manager, at said QoS manager, performing said step of adjusting said available resource value for each link forming said assigned path of said double-ended request, and for each link in said network for said single-ended request.

16. The method of claim 15, wherein said step of identifying an assigned path includes creating and maintaining a spanning tree at said edge router.

17. The method of claim 15, wherein said assigned path comprising a list of link identifications.

18. The method of claim 15, wherein said assigned path comprising a list of router interface identifications.

19. The method of claim 15, wherein said traffic load on each link in said network is reduced by a weighted amount each time said double ended request terminates.

20. The method of claim 19, wherein said step of identifying an assigned path includes creating and maintaining an edge-to-edge routing table at said QoS manager.

21. The method of claim 1, further comprising the following steps:
- determining if said request is single-ended or double-ended;
- maintaining the current network topology and link state information; and
- identifying an assigned path if said request is double-ended, at said QoS manager, performing said step of adjusting said available resource value for each link forming said assigned path of said double-ended request, and for each link in said network for said single-ended request.

22. A QoS manager for admission control (AC) of a traffic service request in an IP network with differentiated services capabilities, comprising:
- an update engine block for periodically providing a single admit limit (AL) to each service for a parameter of interest of said request based on a measurements performed on each link of said network for said service;
- an admit limit block for periodically requesting updates of said AL and recording same;
- an admission control (AC) block for receiving said request, determining whether the amount of traffic of said service for said request is allowed to enter said network by comparing said AL for said service requested with said parameter and for dynamically adjusting said AL for said service requested based on the accepted parameter.

23. The QoS manager of claim 22, wherein said measurements are performed at a preset time interval.

24. A router for admission control (AC) of a traffic service request in an IP network with differentiated services capabilities, comprising:
- I/O interface (IF) means for establishing a direct link with a single or more other routers of said network;
- means for monitoring said I/O (IF) means and measuring available resources in said network corresponding to a parameter of interest of said request, and for transmitting same to a QoS manager, whereby said QoS manager administers a single available resource value for each service, which is periodically determined by said measurement on each link for said service, and said QoS manager determines whether the amount of traffic of said service for said request is allowed to enter said network by comparing said parameter with said available resources value for said service requested, accepts the traffic for said request, and dynamically adjusts said available resource value for said service requested based on the accepted parameter.

25. The router of claim 24, wherein said parameter is measured at a preset time interval.

* * * * *